US009891035B2

(12) United States Patent
Matsumoto et al.

(10) Patent No.: US 9,891,035 B2
(45) Date of Patent: Feb. 13, 2018

(54) DISTANCE SENSOR AND MEASUREMENT METHOD

(71) Applicants: HONDA MOTOR CO., LTD., Tokyo (JP); Gotoh Educational Corporation, Tokyo (JP)

(72) Inventors: Kenji Matsumoto, Wako (JP); Yuji Mihara, Tokyo (JP)

(73) Assignees: HONDA MOTOR CO., LTD., Tokyo (JP); GOTOH EDUCATIONAL CORPORATION, Tokyo (JP)

( * ) Notice: Subject to any disclaimer, the term of this patent is extended or adjusted under 35 U.S.C. 154(b) by 0 days.

(21) Appl. No.: 14/625,018

(22) Filed: Feb. 18, 2015

(65) Prior Publication Data
US 2015/0233696 A1 Aug. 20, 2015

(30) Foreign Application Priority Data

Feb. 19, 2014 (JP) .................................. 2014-029936

(51) Int. Cl.
*G01B 7/02* (2006.01)
*G01D 5/241* (2006.01)

(52) U.S. Cl.
CPC ........... *G01B 7/023* (2013.01); *G01D 5/2417* (2013.01)

(58) Field of Classification Search
CPC ................................. G01B 7/023; G01B 7/14
USPC ................. 324/661, 662, 671, 688
See application file for complete search history.

(56) References Cited

U.S. PATENT DOCUMENTS

| 4,422,035 | A | * | 12/1983 | Risko | 324/671 |
| 4,766,368 | A | * | 8/1988 | Cox | 324/662 |
| 5,070,302 | A | * | 12/1991 | Marcus | 324/661 |
| 5,201,228 | A | * | 4/1993 | Kojima | |
| 5,554,939 | A | * | 9/1996 | Hirae | |
| 5,802,911 | A | * | 9/1998 | Cahill | |
| 6,122,973 | A | * | 9/2000 | Nomura | |
| 6,145,384 | A | * | 11/2000 | Ikeda | |
| 6,828,806 | B1 | * | 12/2004 | Hirota | 324/688 |
| 7,161,360 | B2 | | 1/2007 | Hirota et al. | |

(Continued)

FOREIGN PATENT DOCUMENTS

| GB | 2243220 A | * | 10/1991 | ............... G01B 7/14 |
| JP | 2001-91205 A | | 4/2001 | |

(Continued)

OTHER PUBLICATIONS

Office Action dated Dec. 4, 2017, issued in counterpart Japanese Application No. 2014-029936, with partial English translation. (10 pages).

*Primary Examiner* — Walter L Lindsay, Jr.
*Assistant Examiner* — Milton Gonzalez
(74) *Attorney, Agent, or Firm* — Westerman, Hattori, Daniels & Adrian, LLP

(57) ABSTRACT

A capacitive distance sensor includes a first guard electrode, a conductor, a second guard electrode, and insulators. The conductor includes a sensor electrode and a lead portion and is arranged on a side of a measurement target with respect to the first guard electrode. The second guard electrode is arranged on the side of the measurement target with respect to the conductor. The first guard electrode includes portions overlapping the sensor electrode and the lead portion. The second guard electrode includes a portion overlapping the lead portion and does not overlap the sensor electrode.

18 Claims, 8 Drawing Sheets

(56) References Cited

U.S. PATENT DOCUMENTS

2012/0070280 A1* 3/2012 Wadehn
2012/0161793 A1* 6/2012 Satake
2014/0103942 A1* 4/2014 Izrailit .......................... 324/662

FOREIGN PATENT DOCUMENTS

| JP | 2005-183744 A | 7/2005 |
| JP | 2013-516601 A | 5/2013 |
| WO | 2011/080308 A1 | 7/2011 |

* cited by examiner

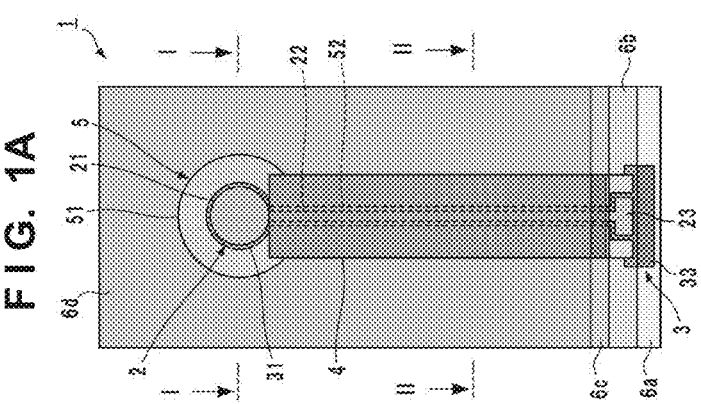
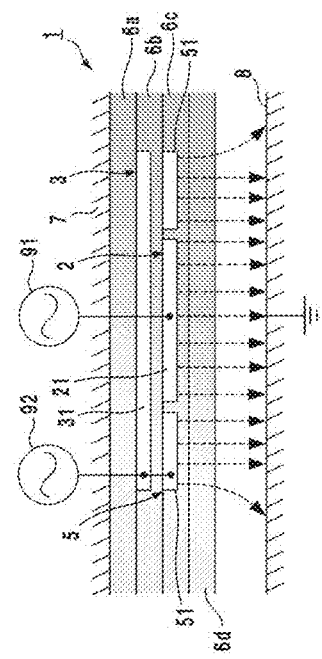
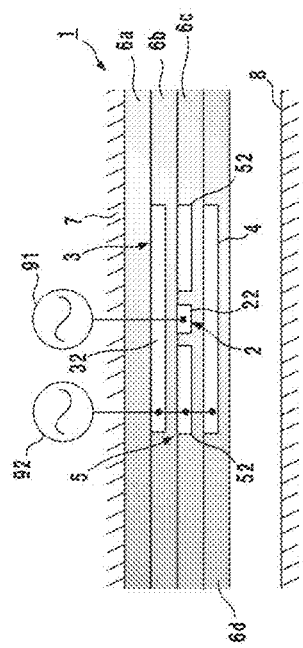

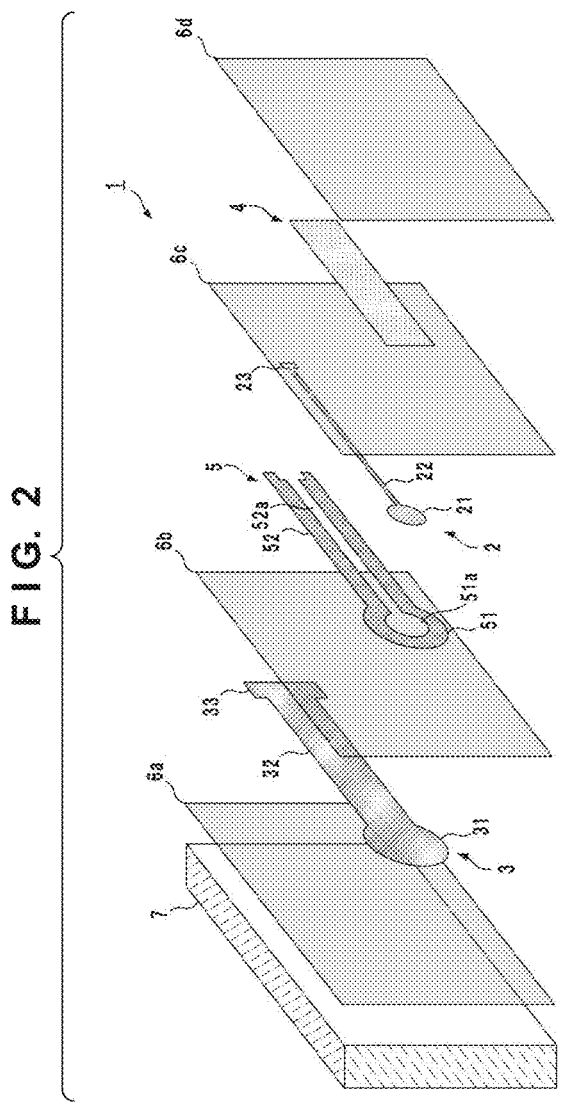

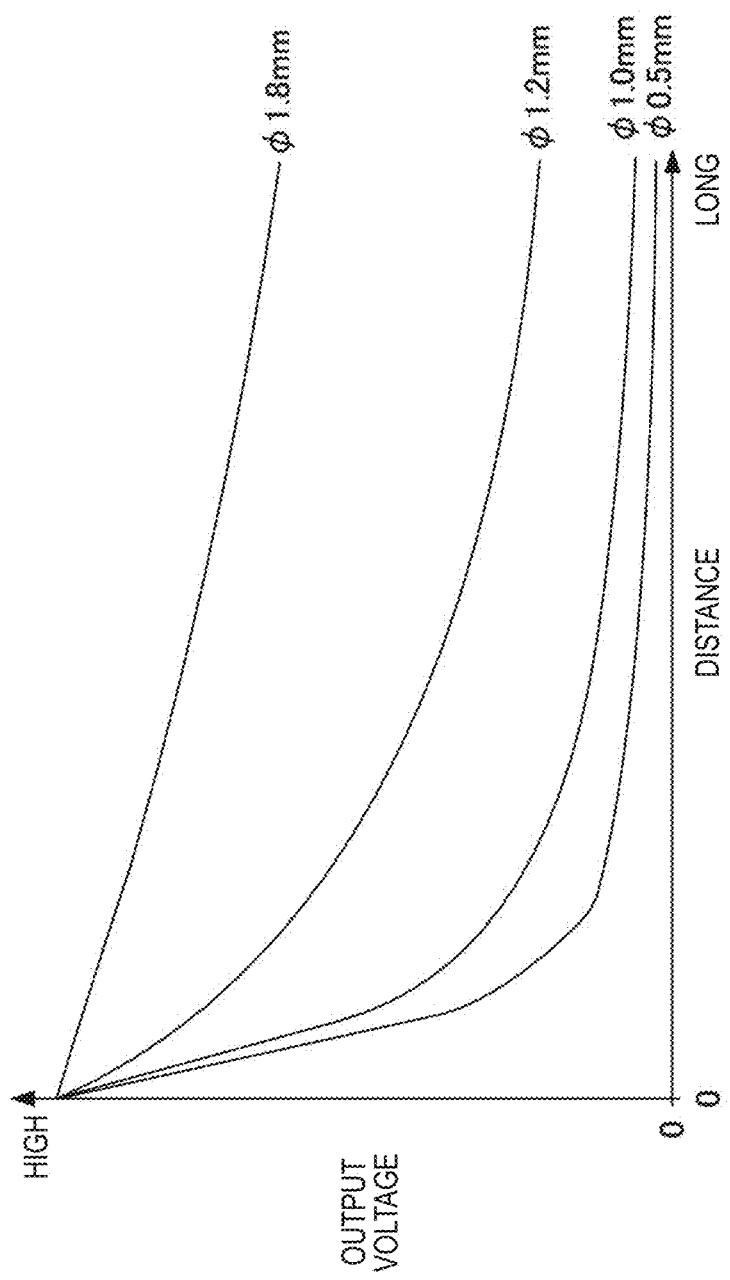

DISTANCE SENSOR AND MEASUREMENT METHOD

BACKGROUND OF THE INVENTION

Field of the Invention

The present invention relates to a capacitive distance sensor.

Description of the Related Art

As a sensor for measuring the distance (e.g. gap) between objects or the like, a capacitive distance sensor is known. As such a distance sensor, Japanese Patent Laid-Open No. 2013-516601 discloses a sensor that attempts to improve the performance of the sensor by providing guard electrodes around or behind a sensor electrode (sensing electrode).

When a measurement target is a movable object or has a curved measurement surface, it is necessary to narrow the measurement range and measure the distance in a spot to improve measurement accuracy. To narrow the measurement range, the area of the sensor electrode needs to be reduced.

However, a lead portion to input a signal from a measurement signal source is connected to the sensor electrode. When the sensor electrode is made small, the capacitance between the lead portion and the measurement surface may degrade the measurement accuracy.

SUMMARY OF THE INVENTION

It is an object of the present invention to reduce the influence of a lead portion on distance measurement accuracy.

According to an aspect of the present invention, there is provided a capacitive distance sensor comprising: a first guard electrode; a conductor including a sensor electrode and a lead portion extending from the sensor electrode and arranged on a side of a measurement target with respect to the first guard electrode; a second guard electrode arranged on the side of the measurement target with respect to the conductor; an insulator arranged between the first guard electrode and the conductor; an insulator arranged between the conductor and the second guard electrode, wherein the first guard electrode comprises a portion overlapping the sensor electrode and a portion overlapping the lead portion, the second guard electrode comprises a portion overlapping the lead portion, and the second guard electrode does not overlap the sensor electrode.

According to another aspect of the present invention, there is provided a measurement method of measuring a distance between a first object and a second object, the method comprising: a preparation step of providing a plurality of distance sensors according to the above sensor on the first object; and a measurement step of inputting a measurement signal to the conductor while maintaining the first guard electrode and the second guard electrode of each distance sensor equipotential to the conductor, wherein in the preparation step, the sensor electrodes of the distance sensors are arranged at positions different from each other, and each distance sensor is provided such that the first guard electrode is located on a side of the first object, and the second guard electrode is located on a side of the second object.

Further features of the present invention will become apparent from the following description of exemplary embodiments (with reference to the attached drawings).

BRIEF DESCRIPTION OF THE DRAWINGS

FIGS. 1A to 1C are explanatory views of a distance sensor according to an embodiment of the present invention;

FIG. 2 is an exploded perspective view of the distance sensor shown in FIGS. 1A to 1C;

FIG. 5 is a graph showing an experimental result;

DESCRIPTION OF THE EMBODIMENTS

Figure 3A:
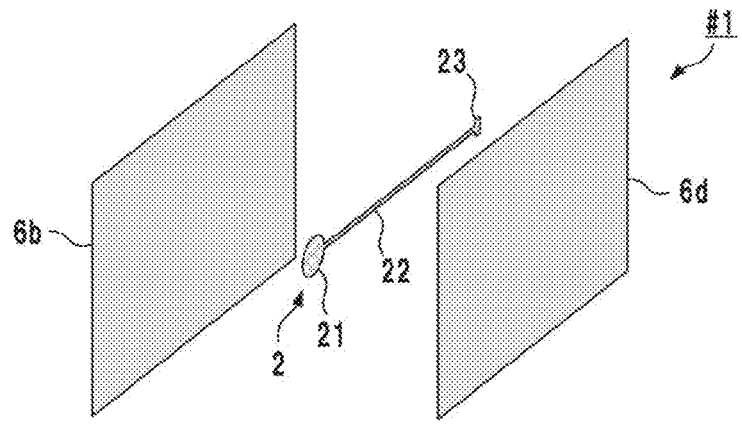
FIGS. 3A to 3C are exploded perspective views of comparative examples.

A distance sensor 1 according to an embodiment of the present invention will be described with reference to FIGS. 1A to 2. FIG. 1A is a view showing the outer appearance of the distance sensor 1 viewed from the detection surface side (side of an insulator 6d to be described later). FIG. 1B is a sectional view taken along a line I-I in FIG. 1A, that is, a sectional view passing through a sensor electrode 21 to be described later. FIG. 1C is a sectional view taken along a line II-II in FIG. 1A, that is, a sectional view passing through a lead portion 22 to be described later. FIGS. 1B and 1C illustrate all of an object 7 to which the distance sensor 1 is attached, an object 8 that is a measurement target, and a measurement circuit. The objects 7 and 8 are conductors. FIG. 2 is an exploded perspective view of the distance sensor 1.

The distance sensor 1 forms a sheet-shaped stacked body in which film-shaped conductors that form electrodes and film-shaped insulators that insulate the electrodes from each other are alternately stacked. Each component will be described below in detail. Note that several components in the drawings are illustrated with shading or a pattern. This aims at helping understand the positional relationship between the components in the drawings and does not indicate the shading or pattern of the components themselves.

The distance sensor 1 includes a conductor 2, guard electrodes 3 to 5, and insulators 6a to 6d (to be generically referred to as an insulator 6). The conductor 2 and the guard electrodes 3 to 5 can be made of a material having conductivity, for example, a metal material such as an aluminum alloy. A material having a low electric resistivity is preferably used. The insulator 6 is formed from, for example, a resin film.

The conductor 2 integrally includes the sensor electrode 21, the lead portion 22 extending from the sensor electrode 21, and a terminal portion 23 connected to an end of the lead portion 22. The sensor electrode 21 is a sensing portion for detecting a distance and is arranged so as to face the object 8. The capacitance generated between the sensor electrode 21 and the object 8 changes depending on the distance between them. When the capacitance is measured, the distance between the sensor electrode 21 and the object 8 (in other words, the distance between the object 7 and the object 8) can be measured. The outer shape of the distance sensor 1 can be either rectangular or circular, and a circular shape is employed here. The circular shape can facilitate narrowing of the measurement range and measurement of the distance in a spot.

The lead portion 22 connects the sensor electrode 21 and the terminal portion 23. The lead portion 22 has a linear shape narrower than the sensor electrode 21. More specifically, the line width of the lead portion 22 is smaller than the diameter of the sensor electrode 21. When the line width of the lead portion 22 is decreased, the influence of the lead portion 22 on the distance measurement accuracy can be reduced.

A wire from a measurement signal source 91 is connected to the terminal portion 23. An arrangement that connects the wire from the measurement signal source 91 to the end of the lead portion 22 without providing the terminal portion 23 can also be employed. In this arrangement, however, a constraint may occur in decreasing the line width of the lead portion 22 in consideration of the wiring workability. When the terminal portion 23 is provided, the wiring workability can be improved while decreasing the line width of the lead portion 22 and thus reducing the influence of the lead portion 22 on the distance measurement accuracy.

The guard electrode 3 is arranged on the side of the object 7 with respect to the conductor 2. Inversely speaking, the conductor 2 is arranged on the side of the object 8 with respect to the guard electrode 3. The guard electrode 3 is disposed in parallel to the sensor electrode 21 and the lead portion 22, and includes portions 31 and 32 that overlap the sensor electrode 21 and the lead portion 22 in its normal direction (that is, the stacking direction of the distance sensor 1). When the guard electrode 3 intervenes between the object 7 and the sensor electrode 21 and the lead portion 22, and the guard electrode 3 is set equipotential to the conductor 2, it is possible to prevent generation of electric lines of force from the sensor electrode 21 and the lead portion 22 to the object 7.

The portions 31 and 32 can have the same areas as the sensor electrode 21 and the lead portion 22. In this embodiment, however, they are formed in a wider area so as to overlap the peripheral portions of the sensor electrode 21 and the lead portion 22 as well. This reliably prevents generation of electric lines of force from the sensor electrode 21 and the lead portion 22 to the object 7.

In this embodiment, the guard electrode 3 also includes a portion 33 that overlaps the terminal portion 23. This can prevent generation of electric lines of force from the terminal portion 23 to the object 7 and reduce the influence of the terminal portion 23 on the distance measurement accuracy while improving the wiring workability.

The guard electrode 4 is arranged on the side of the object 8 with respect to the conductor 2. The guard electrode 4 is disposed in parallel to the lead portion 22, and includes a portion that overlap the lead portion 22 in its normal direction (that is, the stacking direction of the distance sensor 1). Unlike the guard electrode 3, the guard electrode 4 does not overlap the sensor electrode 21.

When the guard electrode 4 intervenes between lead portion 22 and the object 8, and the guard electrode 4 is set equipotential to the conductor 2, it is possible to prevent generation of electric lines of force from the lead portion 22 to the object 8. Since the guard electrode 4 does not overlap the sensor electrode 21, electric lines of force are generated from the sensor electrode 21 to the surface (measurement surface) of the object 8 even when the guard electrode 4 is set equipotential to the conductor 2.

The guard electrode 4 can have the same area as the lead portion 22. In this embodiment, however, it is formed in a wider area so as to overlap the peripheral portion of the lead portion 22 as well. This reliably prevents generation of electric lines of force from the lead portion 22 to the object 8.

The guard electrode 5 is arranged on the same plane as the conductor 2. The guard electrode 5 includes a guard portion 51 arranged so as to surround the sensor electrode 21. In this embodiment, the outer shape of the guard portion 51 is similar to that of the sensor electrode 21. Hence, the outer shape of the guard portion 51 is circular. An opening portion 51a slightly larger than the outer shape of the sensor electrode 21 is formed at the center of the guard portion 51. The sensor electrode 21 is arranged in the opening portion 51a without contacting the guard portion 51.

The guard electrode 5 also includes a lead portion 52 extending from the guard portion 51. An opening portion 52a slightly larger than the outer shape of the lead portion 22 and the terminal portion 23 is formed at the center of the lead portion 52 in the widthwise direction. The lead portion 22 and the terminal portion 23 are arranged in the opening portion 52a without contacting the lead portion 52.

The insulator 6a is arranged on the side of the object 7 with respect to the guard electrode 3, that is, arranged on the opposite side of the object 8 with respect to the guard electrode 3. The insulator 6a insulates the object 7 from the guard electrode 3.

The insulator 6b is arranged between the guard electrode 3 and the conductor 2. The insulator 6b insulates the conductor 2 from the guard electrode 3. The insulator 6c is arranged between the conductor 2 and the guard electrode 4. The insulator 6c insulates the conductor 2 from the guard electrode 4.

The insulator 6d is arranged on the side of the object 8 with respect to the guard electrode 4. The insulator 6d insulates the object 8 from the guard electrode 4, but mainly aims at functioning as a protective film for protecting the distance sensor 1 from the object 8. Hence, the insulator 6d may be thicker than the remaining insulators 6a to 6c. When the object 8 is a movable object or the like and may come into contact with the distance sensor 1 during measurement, the insulator 6d can effectively protects the interior of the distance sensor 1. Inversely, if the possibility of contact between the object 8 and the distance sensor 1 is low, the insulator 6d can be omitted.

The insulators 6a to 6d have different lengths in the longitudinal direction. As shown in FIG. 1A, the portion 33 of the guard electrode 3, the terminal portion 23 of the conductor 2, the lead portion 52 of the guard electrode 5, and the guard electrode 4 are partially exposed to an end of the distance sensor 1, and wires can be connected to them.

The object 7 is a substrate that supports the distance sensor 1, or a member that is arranged facing a member (for example, object 8) that constitutes one of the measurement targets of gap measurement and constitutes the other of the measurement targets. The distance sensor 1 can be attached to the object 7 by, for example, providing the insulator 6a with an adhesive layer located between the insulator 6a and the object 7 and adhering the distance sensor 1 to the distance sensor 1. This allows the distance sensor 1 to be relatively easily installed.

When manufacturing the distance sensor 1, for example, the insulator 6a, the guard electrode 3, the insulator 6b, the conductor 2 and the guard electrode 5, the insulator 6c, the guard electrode 4, and the insulator 6d are formed in this order on the object 7 by sputtering or the like while being stacked. As another example, resin films prepared as the insulators 6a to 6d. The guard electrode 3 is formed on the insulator 6a, the conductor 2 and the guard electrode 5 are formed on the insulator 6b, and the guard electrode 4 is formed on the insulator 6c. Then, the insulator 6a and the guard electrode 3, the insulator 6b and the conductor 2 and the guard electrode 5, the insulator 6c and the guard electrode 4, and the insulator 6d are stacked in this order. The distance sensor 1 may thus be manufactured as a sheet-shaped stacked body.

In this embodiment, the layer structure includes three layers of conductors (the guard electrode 3, the conductor 2 and the guard electrode 5, and the guard electrode 4) and four layers of insulators (insulators 6a to 6d). However, the present invention is not limited to this, and another layer structure including a different number of layers may be employed.

The function of the distance sensor 1 having the above-described arrangement will be described with reference to FIGS. 1B and 1C. FIGS. 1B and 1C assume that the distance sensor 1 is adhered to the object 7 and measures the distance between the object 7 and the object 8. The measurement signal source 91 is connected to the conductor 2, and, for example, an AC measurement signal is input. A signal source 92 is connected to the guard electrodes 3 to 5, and a signal is input so as to make them equipotential to the conductor 2. The object 8 is connected to the ground of the measurement signal source 91 and the signal source 92. Note that the measurement signal source 91 and the signal source 92 may be integrated.

When the measurement signal is input, electric lines of force indicated the broken lines are generated from the sensor electrode 21 to the object 8, as shown in FIG. 1B. At this time, electric lines of force indicated by broken lines are also generated from the guard portion 51 of the guard electrode 5 to the object 8. This can reduce bending of the electric lines of force at the edge of the sensor electrode 21 due to the edge effect. In addition, the existence of the guard electrode 3 suppresses generation of electric lines of force toward the object 7.

The capacitance between the sensor electrode 21 and the surface (measurement surface) of the object 8 changes in proportion to the magnitude of the distance, and the impedance thus changes. When the measurement signal is observed, the distance between the sensor electrode 21 and the object 8, that is, the distance between the object 7 and the object 8 can be measured or calculated.

Place focus on the lead portion 22. As shown in FIG. 1C, the existence of the guard electrode 3 suppresses generation of electric lines of force toward the object 7, and additionally, the existence of the guard electrode 4 suppresses generation of electric lines of force toward the object 8. That is, it is possible to measure the capacitance with respect to the object 8 in a spot only within the range of the sensor electrode 21 and reduce the influence of the lead portion 22 on the distance measurement accuracy.

EXAMPLES

Experiments were conducted concerning the effect of improving the distance measurement accuracy by the existence of the guard electrode 3 or 4. These will be described with reference to FIGS. 3A to 3C and 4A to 4C.

An example of the present invention employed a structure shown in FIG. 2. The sensor electrode 21 had a circular shape having a diameter of 1 mm. The lead portion 22 had a line width of 0.1 mm. The range of the measurement distance was about 0 to 100 μm. The measurement circuit was formed so as to output a measurement result (voltage) in inverse proportion to an increase in the distance. The same distance was measured using a commercially available probe-type capacitive distance sensor. Using the measurement result as a reference value, the example and comparative examples are evaluated.

Figure 3B:
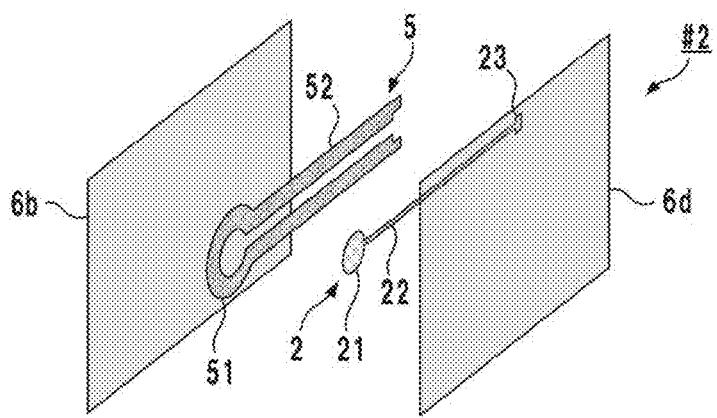
Figure 3C:
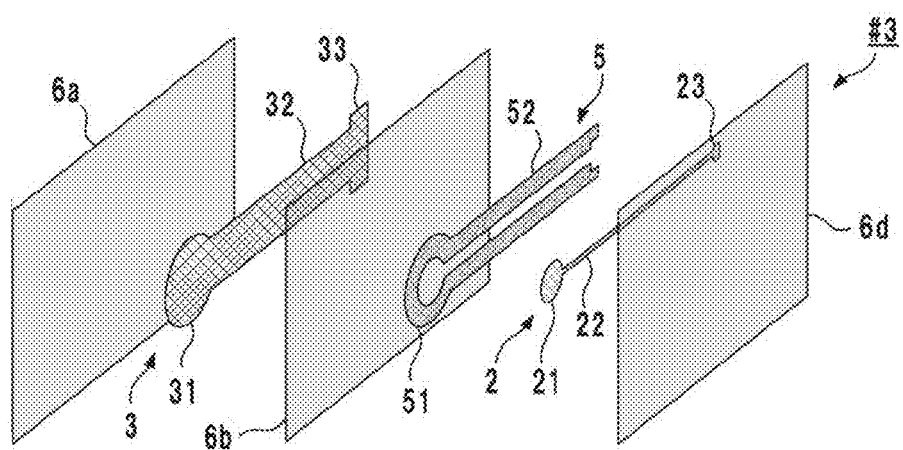

FIGS. 3A to 3C show the sensor structures of comparative examples. The comparative example (to be referred to as Comparative Example 1) shown in FIG. 3A is different from the example in that the guard electrodes 3 to 5 are not provided. The comparative example (to be referred to as Comparative Example 2) shown in FIG. 3B is different from the example in that the guard electrodes 3 and 4 are not provided. The comparative example (to be referred to as Comparative Example 3) shown in FIG. 3C is different from the example in that the guard electrode 4 is not provided.

Figure 4A:
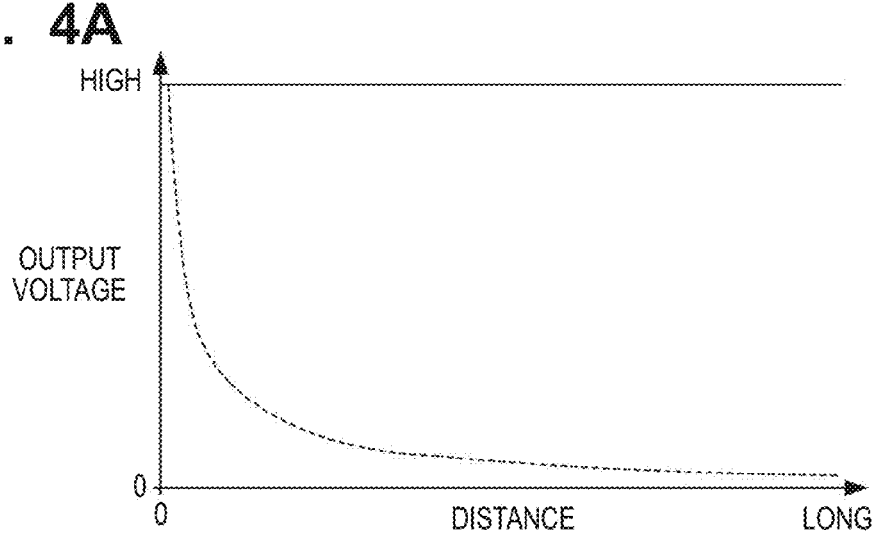
FIGS. 4A to 4C are graphs showing the results of comparative experiments.
Figure 4B:
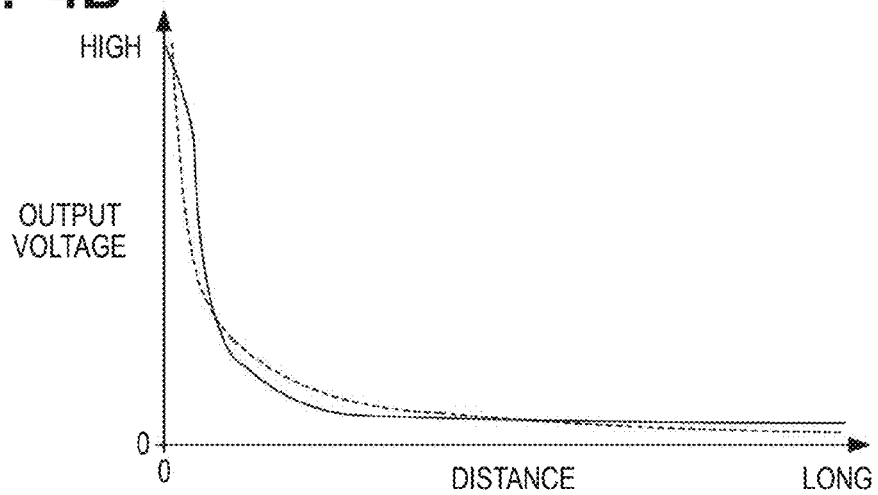
Figure 4C:
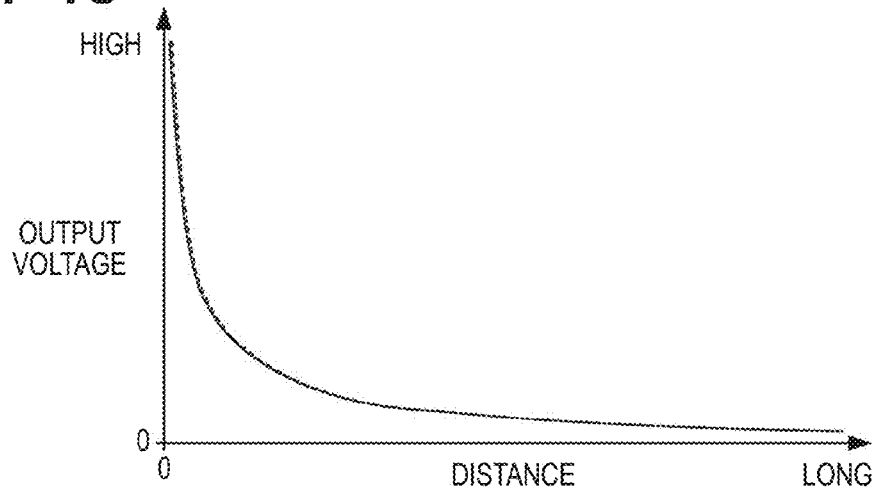

FIGS. 4A and 4B show the measurement results of Comparative Examples 1 to 3, and FIG. 4C shows the measurement result of the example. In each graph, the broken line indicates the measurement result of the commercially available probe-type capacitive distance sensor as the reference value.

FIG. 4A shows the measurement result of Comparative Examples 1 and 2. The output voltage was almost constant with respect to the distance, and the result revealed to be impractical.

FIG. 4B shows the measurement result of Comparative Example 3. The output voltage changed with respect to the distance. Although the change tendency was close to the reference value, a deviation occurred.

FIG. 4C shows the measurement result of the example. A measurement result almost the same as the reference value was obtained. As can be understood from the comparison of the structures and measurement results between the example and Comparative Example 3, the capacitance between a lead portion 22 and the measurement surface affects the measurement result in the structure of Comparative Example 3, and the influence of the lead portion 22 can be canceled by providing the guard electrode 4 in the example.

The superiority of the distance sensor according to the example over the commercially available probe-type capacitive distance sensor is in the degree of flexibility of the application portion. The distance sensor according to the example can be formed into a thin film shape and can therefore be applied to measurement of a very small gap. The distance sensor is also advantageous because the detection range can be narrowed by making the sensor electrode 21 small. For example, the distance sensor according to the example can be used to measure the gap between an object at rest and a movable object. With multipoint measurement, the behavior of the movable object can also be measured. A detailed application example will be described later.

A plurality of examples were created in which the diameter of the sensor electrode 21 was changed, and the output characteristics were measured. FIG. 5 shows the experimental result. In this experiment, four examples were created, and the diameter of the sensor electrode 21 was set to 0.5 mm, 1.0 mm, 1.2 mm, and 1.8 mm. Place focus on the change ratio of the output voltage with respect to the measurement distance. As the diameter of the sensor electrode 21 becomes large, the change ratio of the output voltage becomes relatively even for measurement distances in a wider range. For example, in the example in which the sensor electrode 21 having a diameter of 1.8 mm is provided, the linearity of the output voltage becomes high throughout the measurement distance range in the experiment. On the other hand, in the example in which a relatively small sensor electrode 21 having a diameter of 0.5 or 1.0 mm is provided, the linearity of the output voltage is high in a region where the measurement distance is short.

As is apparent from the above explanation, more accurate distance measurement can be performed by selecting the diameter of the sensor electrode 21 in accordance with the length and range of the measurement distance. For example, when the measurement distance is short, employing the sensor electrode 21 having a small diameter is advantageous. On the other hand, when the measurement distance range is wide, employing the sensor electrode 21 having a large diameter is advantageous.

Application Example

The distance sensor according to the present invention is applicable to measure s very small gap, for example, the gap between a shaft and a bearing or the gap between the roller and the roller cage of a roller bearing. In addition, multipoint measurement enables measurement of the behavior (tilt or the like) of a shaft or roller. Needs of such distance measurement for a very small gap have grown in the automobile industry and the like.

In recent engine development, size/weight reduction is proceeding because of fuel consumption regulations aiming at $CO_2$ reduction. In addition, the contact pressure (especially pressure variation) increases due to a high combustion pressure. Along with the increase in the contact pressure, friction/wear is problematically increased in the portions of an engine by deterioration of the lubricating condition. Basic design by CAE has been introduced in designing an engine or transmission. However, there is something left to be desired in individual cases, and verifying calculations or tracking down causes of problems by experiments is essential to obtain very useful information for development of the next-generation engines or transmissions. In, for example, a piston skirt, since the amount and timing of bubble generation by cavitation or aeration are unknown in each engine, a difference may occur between the calculated value and the measured value. In a clutch, the bending amount is not constant, which is said to be a possible cause of stick slip.

An idling stop mechanism aiming at improving the fuel consumption poses a new problem different from the friction/wear state that occurs in the conventional engine or transmission. A measurement tool capable of clarifying these problems is a measurement technology by a thin-film distance sensor.

That is, the thin-film distance sensor is a technology that can contribute not only to development of the next-generation engines/transmissions but also to improve the performance of analysis tools useful for the development. The present invention is applicable to measure an oil film thickness necessary to unravel the lubricating condition of an engine or transmission sliding portion or the like.

Figure 6A:
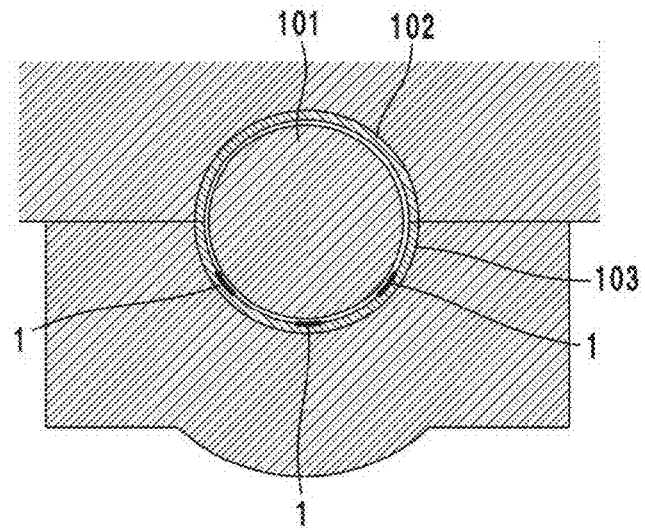
FIGS. 6A to 6C are explanatory views of an application example.
Figure 6B:
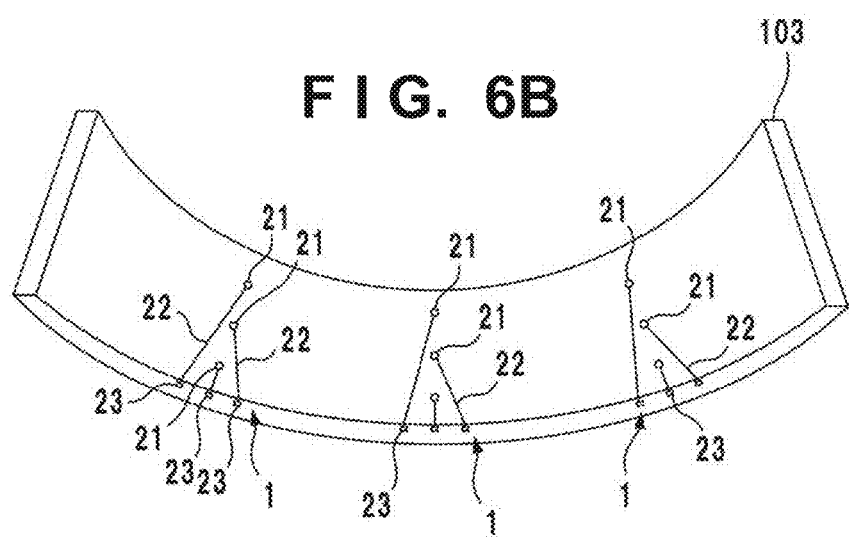
Figure 6C:
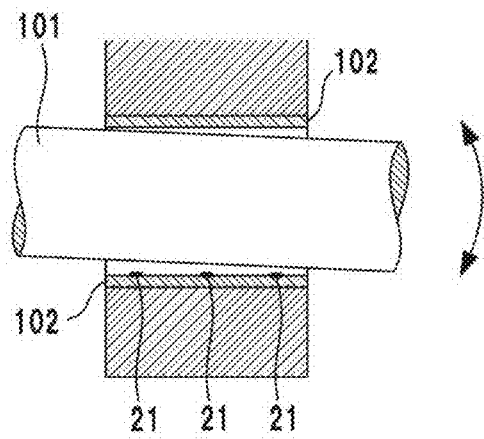

FIGS. 6A to 6C illustrate an application example of the above-described distance sensor 1. FIGS. 6A to 6C show an example in which the distance sensor 1 is applied to measure the distance between a crank shaft 101 of an engine and one of bearing metals 102 and 103.

In the example shown in FIGS. 6A to 6C, a plurality of distance sensors 1 are provided on the inner surface of the bearing metal 103. FIG. 6B shows the arrangement of the distance sensors 1. A total of nine distance sensors 1 are adhered to the inner surface of the bearing metal 103 so that the number of measurement points is three in the axial direction and three in the circumferential direction. A plurality of types of distance sensors 1 are prepared, whose lead portions 22 have different lengths and the like. The terminal portions 23 are located on the end face of the bearing metal 103. Before measurement, the plurality of distance sensors 1 are arranged such that the sensor electrodes 21 are located at positions different from each other (preparation step). Note that although not illustrated in FIG. 6B, each distance sensor 1 is provided such that the guard electrode 3 is located on the side of the inner surface of the bearing metal 103 with respect to the conductor 2, and the guard electrode 4 is located on the opposite side (side of the crank shaft 101) with respect to the conductor 2, as a matter of course.

After that, the crank shaft 101 and the bearing metals 102 and 103 are assembled into the state of FIG. 6A, and the process advances to gap measurement. In the measurement step, a measurement signal is input to the conductor 2 while maintaining the guard electrodes 3 to 5 equipotential to the conductor 2, as described above. At this time, when measurement is performed while rotating the crank shaft 101, the gap (that is, oil film) during actual engine driving can be measured.

By executing the measurement step, the measurement results at the nine points can be obtained for a dynamic gap variation between the outer surface of the crank shaft 101 and the inner surface of the bearing metal 103. As a result, the behavior of the crank shaft 101 at the time of driving, for example, swing of the crank shaft 101 as indicated by the arrow in FIG. 6C can also be verified.

Other Embodiments

Figure 7A:
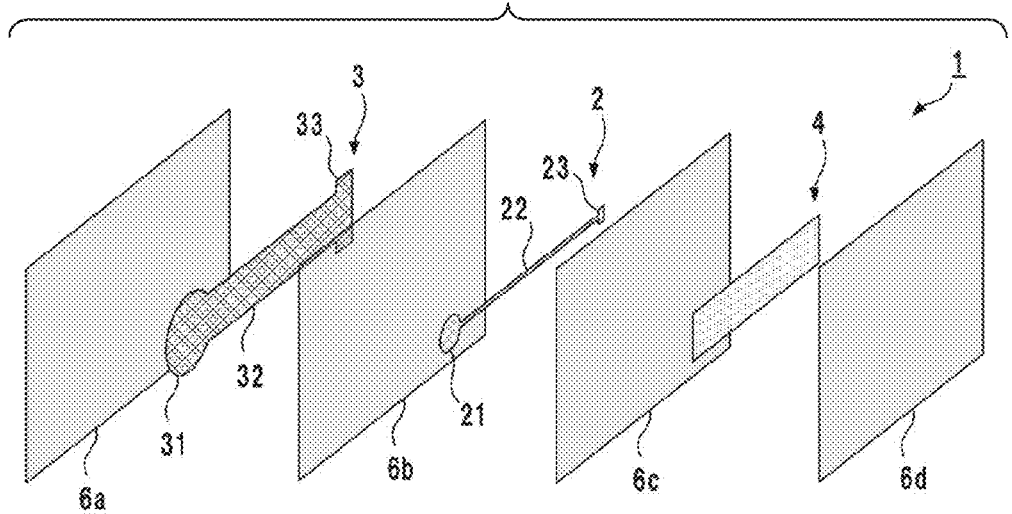
FIGS. 7A and 7B are explanatory views of a distance sensor of another example.
Figure 7B:
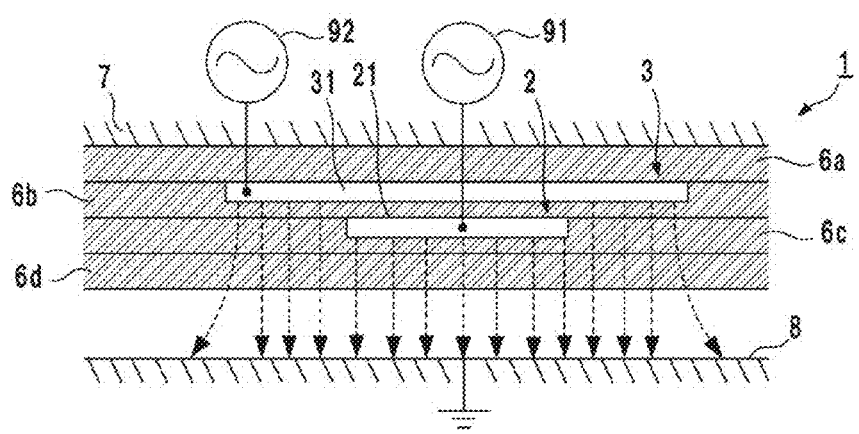

In the above embodiment, the guard electrode 5 is provided. However, the guard electrode 5 can be omitted. FIGS. 7A and 7B show an example. FIG. 7A is an exploded perspective view, and FIG. 7B is a sectional view on a sensor electrode 21. The difference from the above embodiment is only the presence/absence of a guard electrode 5.

A portion 31 of a guard electrode 3 is formed in a wider area so as to overlap the peripheral portion of the sensor electrode 21, as already described, and has a portion that surrounds the sensor electrode 21, although there is a shift in the stacking direction. For this reason, as shown in FIG. 7B, electric lines of force indicated by the broken lines are generated from the portion 31 of the guard electrode 3 to an object 8. This can reduce bending of the electric lines of force at the edge of the sensor electrode 21 due to the edge effect. It is possible to obtain the same effect as in the case where the guard electrode 5 is provided.

Figure 8A:
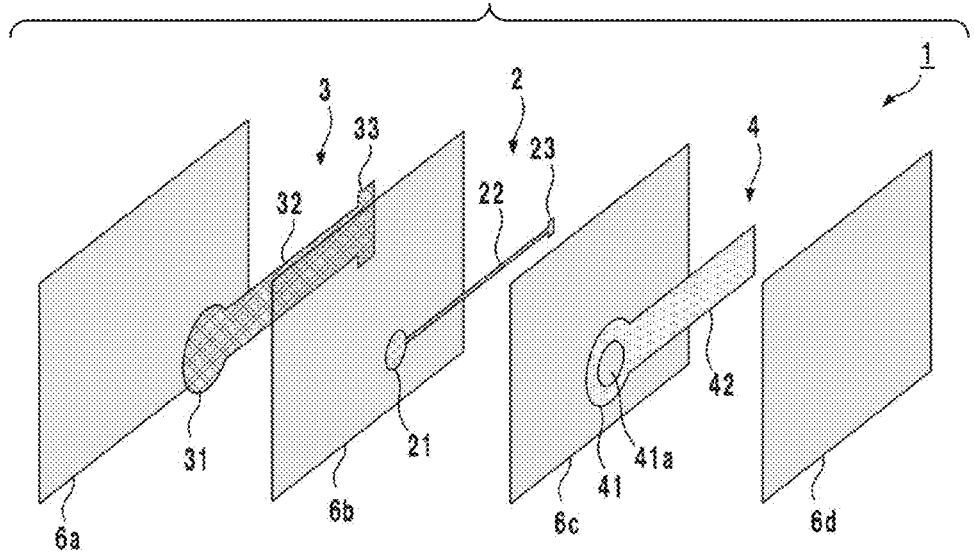
FIGS. 8A and 8B are explanatory views of a distance sensor of still another example.
Figure 8B:
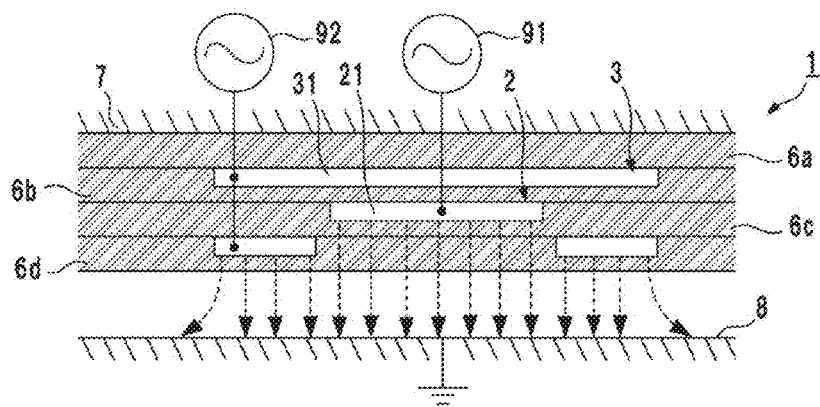

FIGS. 8A and 8B show another example of omission of the guard electrode 5. FIG. 8A is an exploded perspective view, and FIG. 8B is a sectional view on the sensor electrode 21. The differences from the above embodiment are the presence/absence of the guard electrode 5 and the shape of a guard electrode 4.

In the example shown in FIGS. 8A and 8B, the guard electrode 4 includes portions 41 and 42. The portion 42 overlaps a lead portion 22. The guard electrode 4 according to this embodiment has a shape formed by adding the portion 41 to the guard electrode 4 of the above-described embodiment.

The portion 41 has a shape surrounding the sensor electrode 21, although there is a shift in the stacking direction. More specifically, the portion 41 has a circular outer shape, and an opening portion 41a slightly larger than the outer shape of the sensor electrode 21 is formed at the center. The sensor electrode 21 is arranged so as to overlap the opening portion 41a. Hence, the guard electrode 4 does not overlap the sensor electrode 21.

As shown in FIG. 8B, electric lines of force indicated by the broken lines are generated from the portion 41 of the guard electrode 4 to the object 8. This can reduce bending of the electric lines of force at the edge of the sensor electrode 21 due to the edge effect. It is possible to obtain the same effect as in the case where the guard electrode 5 is provided.

Since the opening portion 41a is provided, generation of electric lines of force from the sensor electrode 21 to the object 8 is not impeded. In the example shown in FIGS. 8A and 8B, the portion 31 of the guard electrode 3 also has a portion surrounding the sensor electrode 21. This surrounding portion may be absent.

As described above, when at least one of the guard electrodes 3 and 4 has a portion surrounding the sensor electrode 21, bending of the electric lines of force at the edge of the sensor electrode 21 due to the edge effect can be reduced.

Note that the embodiment can appropriately be designed. For example, the size of the sensor electrode can appropriately be changed. Its shape is not limited to a circular shape, and any other shape may be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-029936, filed Feb. 19, 2014, which is hereby incorporated by reference herein in its entirety.

What is claimed is:

1. A capacitive distance sensor comprising:
a first guard electrode;
a conductor comprising a sensor electrode, a lead portion extending from said sensor electrode and a terminal portion connected to an end of said lead portion and arranged on a side of a measurement target with respect to said first guard electrode;
a second guard electrode arranged on the side of the measurement target with respect to said conductor;
a first insulator arranged between said first guard electrode and said conductor; and
a second insulator arranged between said conductor and said second guard electrode, wherein
said terminal portion has a first surface at a side of the first guard electrode and a second surface at a side of the second guard electrode as an electric contact for being electrically connected to a signal source,
said first guard electrode comprises a portion overlapping said sensor electrode, a portion overlapping said lead portion and a portion overlapping first surface of said terminal portion,
said first guard electrode has one end at a side of said sensor electrode and the other end at a side of said terminal portion,
said second guard electrode comprises a portion overlapping said lead portion,
said second guard electrode has one end at a side of said sensor electrode and the other end at a side of said terminal portion,
said second guard electrode does not overlap said sensor electrode and said second surface of said terminal portion, and
said terminal portion is positioned between the other end of said first guard electrode and the other end of said second guard electrode.

2. The sensor according to claim 1, further comprising a third guard electrode arranged so as to surround said sensor electrode.

3. The sensor according to claim 2, wherein said third guard electrode includes a portion around said terminal portion.

4. The sensor according to claim 1, further comprising:
a third insulator arranged on an opposite side of the measurement target with respect to said first guard electrode; and
a fourth insulator arranged on the side of the measurement target with respect to said second guard electrode,
wherein each insulator, said first guard electrode, said second guard electrode, and said conductor form a sheet-shaped stacked body in which said third insulator, said first guard electrode, said first insulator, said conductor, said second insulator, said second guard electrode, and said fourth insulator are stacked in an order named,
said first insulator has one end at a side of said sensor electrode and the other end at a side of said terminal portion,
said second insulator has one end at a side of said sensor electrode and the other end at a side of said terminal portion,
said third insulator has one end at a side of said sensor electrode and the other end at a side of said terminal portion,
said fourth insulator has one end at a side of said sensor electrode and the other end at a side of said terminal portion,
a portion of said first guard electrode is positioned and exposed between the other end of said third insulator and the other end of said first insulator,
said terminal portion is positioned and exposed between the other end of said first insulator and the other end of said second insulator, and
a portion of said second guard electrode is positioned and exposed between the other end of said second insulator and the other end of said fourth insulator.

5. The sensor according to claim 4, wherein the capacitive distance sensor is adhered to a member arranged facing the measurement target.

6. The sensor according to claim 1, wherein said lead portion has a linear shape narrower than said sensor electrode.

7. The sensor according to claim 6, wherein a width of said lead portion is 0.1 mm.

8. The sensor according to claim 1, wherein said sensor electrode has a circular shape.

9. The sensor according to claim 8, wherein a diameter of said sensor electrode is not less than 0.5 mm and not greater than 1.8 mm.

10. The sensor according to claim 1, wherein at least one of said first guard electrode or said second guard electrode comprises a portion surrounding said sensor electrode.

11. A measurement method of measuring a distance between a first object and a second object, the method comprising:
a preparation step of providing a plurality of capacitive distance sensors according to claim 1 on the first object; and
a measurement step of inputting a measurement signal to the conductor while maintaining the first guard electrode and the second guard electrode of each capacitive distance sensor equipotential to the conductor,
wherein in the preparation step, the plurality of capacitive distance sensors are provided on the first object so that the sensor electrodes of the capacitive distance sensors are arranged at positions different from each other, and each capacitive distance sensor is provided such that the first guard electrode is located on a side of the first object, and the second guard electrode is located on a side of the second object, and wherein in the measurement step, the respective distances between the first object and the second object at the positions are measured by the plurality of capacitive distance sensors.

12. The method according to claim 11, wherein
the first object is a bearing,
the second object is a shaft,
the bearing includes an inner surface directly facing an outer surface of the shaft and an end surface,
the sensor electrodes of the plurality of capacitive distance sensors are provided on the inner surface in an axial direction,
the terminal portions of the plurality of capacitive distance sensors are provided on the end surface in an circumferential direction, and
in the measurement step, distances between the inner surface and the outer surface are measured.

13. The method according to claim 12, wherein the shaft is rotated in the measurement step.

14. The method according to claim 11, wherein
the first object is a roller cage, and
the second object is a roller.

15. The method according to claim 14, wherein the plurality of capacitive distance sensors includes distance sensors lead portions of which have lengths different from each other.

16. The method according to claim 11, wherein
the first object is a bearing metal,
the second object is a crank shaft,
the bearing metal includes an inner surface directly facing an outer surface of the crank shaft and an end surface,
the sensor electrodes of the plurality of capacitive distance sensors are provided on the inner surface of the bearing metal in an axial direction,
the terminal portions of the plurality of capacitive distance sensors are provided on the end surface in a circumferential direction, and
in the measurement step, distances between the inner surface and the outer surface are measured.

17. The sensor according to claim 1, wherein said terminal portion has a width wider than a width of said lead portion.

18. The sensor according to claim 1, wherein a range of distances is about 0 to 100 μm.

* * * * *